(12) United States Patent
Imabayashi et al.

(10) Patent No.: US 12,373,609 B2
(45) Date of Patent: Jul. 29, 2025

(54) CONVERSION DEVICE FOR SECURE COMPUTATION, SECURE COMPUTATION SYSTEM, CONVERSION METHOD FOR SECURE COMPUTATION AND CONVERSION PROGRAM FOR SECURE COMPUTATION

(71) Applicant: EAGLYS Inc., Tokyo (JP)

(72) Inventors: Hiroki Imabayashi, Tokyo (JP); Kentaro Mihara, Tokyo (JP)

(73) Assignee: EAGLYS Inc., Tokyo (JP)

( * ) Notice: Subject to any disclaimer, the term of this patent is extended or adjusted under 35 U.S.C. 154(b) by 0 days.

(21) Appl. No.: 17/788,739

(22) PCT Filed: Jan. 8, 2021

(86) PCT No.: PCT/JP2021/000494
§ 371 (c)(1),
(2) Date: Jun. 24, 2022

(87) PCT Pub. No.: WO2021/149518
PCT Pub. Date: Jul. 29, 2021

(65) Prior Publication Data
US 2023/0041118 A1    Feb. 9, 2023

(30) Foreign Application Priority Data

Jan. 24, 2020  (JP) ................................ 2020-010145

(51) Int. Cl.
*G06F 21/00*    (2013.01)
*G06F 21/71*    (2013.01)

(52) U.S. Cl.
CPC .................................. *G06F 21/71* (2013.01)

(58) Field of Classification Search
CPC ........................................................ G06F 21/71
See application file for complete search history.

(56) References Cited

U.S. PATENT DOCUMENTS

| 2006/0112331 | A1 | 5/2006 | Ashida et al. |
| 2018/0268296 | A1 | 9/2018 | Zheng et al. |
| (Continued) | | | |

FOREIGN PATENT DOCUMENTS

| JP | 2006-146677 A | 6/2006 |
| JP | 2010-287055 A | 12/2010 |
| JP | 6549332 B | 7/2019 |

OTHER PUBLICATIONS

Supplementary European Search Report dated May 31, 2023.
(Continued)

*Primary Examiner* — Brandon Hoffman
*Assistant Examiner* — Thong P Truong
(74) *Attorney, Agent, or Firm* — Yokoi & Co., U.S.A.; Toshiyuki Yokoi

(57) ABSTRACT

A conversion device for secure computation for converting an input data which is an object data of secure computation into an input format applicable to the secure computation is provided. A conversion device for secure computation of the present invention includes an acquisition unit configured to acquire an object data of the secure computation; a storage unit configured to store a correspondence table specifying an input format required for executing the secure computation; a conversion processing unit configured to perform a conversion from the acquired object data into a secure computation data in accordance with the correspondence table; and an output unit configured to output the secure computation data.

11 Claims, 16 Drawing Sheets

(56) References Cited

U.S. PATENT DOCUMENTS

2020/0019867 A1    1/2020  Nandakumar et al.
2021/0358332 A1*  11/2021  Mishina .................. G09C 1/00

OTHER PUBLICATIONS

Communication pursuant to Article 94(3) EPC dated Jun. 9, 2023.
Shaik Imtiyazuddin, et al., "A Recommender System for Efficient Implementation of Privacy Preserving Machine Learning Primitives Base on FHE",Cyber Security Cryptography and Machine Learning: Fourth International Symposium, CSCML2020, Jul. 2-3, 2020.
Communication pursuant to Article 94(3) EPC dated Nov. 23, 2023.
Yu Ishimaki, et al., "Privacy-Preserving String Search for Genome Sequences with FHE bootstrapping optimization", 2016 IEEE International Conference on Big Data (Big Data), Dec. 5, 2016, pp. 3989-3991.
International Search Report for PCT/JP2021/000494 dated Mar. 16, 2021.
PCT written opinion dated Mar. 16, 2021.
Vladimir Kolesnikov, et al., "From Dust to Dawn: Practically Efficient Two-Party Secure Function Evaluation Protocols and their Modular Design", Cryptology ePrint Archive, [online], 2013.
Chiraag Juvekar, et al., "Gazelle: A Low Latency Framework for Secure Neural Network Inference", Cryptology ePrint Archive, [online], 2018.

* cited by examiner

Fig. 4A

| specification data 401 | | | | | | | parameter information 403 |
|---|---|---|---|---|---|---|---|
| algorithm | layer information | | | | | | data file |
| CNN (Convolutional Neural Network) | first layer | second layer | third layer | fourth layer | fifth layer | ... | weight03.param |
| | Convolutional layer | activation layer | pooling layer | fully connected layer | activation layer | | |

Fig. 4B

| specification data 411 | | | parameter information 413 |
|---|---|---|---|
| algorithm | tree depth | ... | data file |
| decision tree | 3 | | weight23.param |

Fig. 5 request condition data

| number of servers | speed | security level | cost |
|---|---|---|---|
| 2 | 8 | 4 | 3 | selective condition — evaluation conditions

| No. | encryption type | encryption scheme | encryption granularity | architecture (number of servers) | option | | | ... |
|---|---|---|---|---|---|---|---|---|
| | | | | | bootstrap | garbled circuit | loss communication | |
| 1 | lattice | BGV | vector | 2 | disable | enable | enable | ... |
| 2 | lattice | HEAAN | matrix | 3 | enable | disable | enable | ... |
| 3 | --- | --- | --- | 3 | --- | enable | disable | ... |
| 4 | Paillier | --- | element | 1 | disable | --- | enable | ... |
| ... | ... | ... | ... | ... | ... | ... | ... | ... |

604

| algorithm | layer (number of times of multiplication) | activation layer | combinable encryption method number | ... |
|---|---|---|---|---|
| NN | 10 or more | ReLU | 1,2,3,4 | ... |
| NN | less than 10 | ReLU | 1,2 | ... |
| NN | 10 or more | Tanh | 3,4,5,6 | ... |
| decision tree | less than 10 | --- | 11,12,13 | ... |
| ... | ... | ... | ... | ... |

Fig. 8

| | encryption type | encryption scheme | speed | security level | cost |
|---|---|---|---|---|---|
| 801 | lattice | BGV | 4 | 8 | 5 |
| 802 | lattice | HEAAN | 6 | 7 | 5 |
| 803 | lattice | GSW | 7 | 7 | 5 |
| 804 | Paillier | — | 9 | 4 | 5 |
| | ... | ... | ... | ... | ... |

| | encryption granularity | encryption scheme | speed | security level | cost |
|---|---|---|---|---|---|
| 811 | element | — | 4 | 5 | 3 |
| 812 | vector | using CRT packing | 6 | 3 | 6 |
| 813 | vector | using FB packing | 6 | 5 | 6 |
| 814 | matrix | using CRT packing | 8 | 3 | 6 |
| 815 | matrix | using FB packing | 8 | 5 | 6 |
| | ... | ... | ... | ... | ... |

| | option | speed | Security level | cost |
|---|---|---|---|---|
| 821 | bootstrap | 2 | 8 | 9 |
| 822 | loss communication | 5 | 6 | 4 |
| 823 | Garbled circuit | 3 | 6 | 4 |
| 824 | secret sharing | 7 | 7 | 3 |
| | ... | ... | ... | ... |

Fig. 13

| No. | encryption type | encryption scheme | encryption granularity | architecture (number of servers) | option | | | ... |
| --- | --- | --- | --- | --- | --- | --- | --- | --- |
| | | | | | bootstrap | garbled circuit | loss communication | |
| #02 | lattice | BGV | element | 1 | enable | — | enable | ... |
| #03 | Paillier | — | element | 1 | disable | — | enable | ... |

1004

1003 — request condition data (evaluation conditions)

| request condition data (evaluation conditions) | speed | security level | cost |
| --- | --- | --- | --- |
| | ⓧ8 | △4 | □3 |

801 —

| encryption type | encryption scheme | speed | security level | cost |
| --- | --- | --- | --- | --- |
| lattice | BGV | 4 | 8 | 5 |

811 —

| encryption granularity | speed | security level | cost |
| --- | --- | --- | --- |
| element | 4 | 5 | 3 |

821 —
822 —

| option | speed | security level | cost |
| --- | --- | --- | --- |
| bootstrap | 2 | 8 | 9 |
| loss communication | 5 | 6 | 4 |

$$\text{score (\#02)} = \frac{8}{10} \times (4 + 4 + 2 + 5) \times \frac{1}{4} \quad \leftarrow \text{speed}$$

$$+ \frac{4}{10} \times (8 + 5 + 8 + 6) \times \frac{1}{4} \quad \leftarrow \text{security level}$$

$$+ \frac{3}{10} \times (5 + 3 + 9 + 4) \times \frac{1}{4} \quad \leftarrow \text{cost}$$

$$\fallingdotseq 7.3$$

CONVERSION DEVICE FOR SECURE COMPUTATION, SECURE COMPUTATION SYSTEM, CONVERSION METHOD FOR SECURE COMPUTATION AND CONVERSION PROGRAM FOR SECURE COMPUTATION

TECHNICAL FIELD

The present disclosure relates to a conversion device for secure computation, a secure computation system, a conversion method for secure computation and a conversion program for secure computation.

BACKGROUND ART

With the spread of artificial intelligence technology, a machine learning has been utilized for the purpose of analyzing sensitive data such as personal information. For example, a technician called as a data scientist or the like performs data analysis using the machine learning by applying a machine learning library (also referred to as "AI library") according to purpose and use.

On the other hand, an encryption technology capable of executing a computation on the data in the encrypted state for the purpose of preventing information leakage is known. For example, Patent Document 1 discloses a secure computation technology capable of executing the computation (calculation) of addition, subtraction, multiplication and division in the encrypted state based on public key encryption using a cryptographic function having a homomorphic property to addition and subtraction.

PRIOR ART DOCUMENTS

Patent Documents

Patent document 1: Japanese Patent Application Publication No. 2011-227193

DISCLOSURE OF THE INVENTION

Problems to be Solved by the Invention

It is preferred that the data analysis of the data such as the sensitive data requiring confidentiality is performed in the encrypted state as described above. Conventionally, the technician having specialized knowledge of the secure computation and AI took necessary steps for applying the data to a secure computation library according to the circumstances. For example, a learning model generated by the AI library or the like was converted into an optimum format for the secure computation. Thus, time and labor were required and operation efficiency was not good. Accordingly, it is expected to develop the technology capable of applying the input data of AI to the secure computation library without requiring special knowledge. For example, a source code of AI is converted into the source code to which the secure computation can be executed, or the input data of AI is converted into the format (e.g., data encryption, encryption method, optimized input structure) acceptable by the secure computation library.

The present disclosure is made for solving the above described problems. The purpose of the present disclosure is to provide a conversion device for secure computation capable of converting the input data into the input format applicable to the secure computation.

Means for Solving the Problem

In order to achieve the above described purpose, a conversion device for secure computation of the present disclosure includes an acquisition unit configured to acquire an object data of the secure computation; a storage unit configured to store a correspondence table specifying an input format required for executing the secure computation; a conversion processing unit configured to perform an conversion from the acquired object data into a secure computation data in accordance with the correspondence table; and an output unit configured to output the secure computation data.

In order to achieve the above described purpose, a secure computation system of the present disclosure includes a processing request unit configured to transmit a processing request of an object data of a secure computation; a secure computation conversion unit; and a secure computation execution unit, wherein the secure computation conversion unit includes: an acquisition unit configured to acquire the object data via the processing request unit; a storage unit configured to store a correspondence table specifying an input format required for executing the secure computation; a conversion processing unit configured to perform an conversion from the acquired object data into a secure computation data in accordance with the correspondence table; and an output unit configured to output the secure computation data to the secure computation execution unit.

In order to achieve the above described purpose, a conversion method for secure computation of the present disclosure is a method for converting an object data of secure computation into a secure computation data by a computer having a control unit and a storage unit, and the conversion method includes a step of acquiring the object data of the secure computation by the control unit; a step of storing a correspondence table specifying an input format required for executing the secure computation in the storage unit by the control unit; a step of performing an conversion from the acquired object data into a secure computation data in accordance with the correspondence table by the control unit; and a step of outputting the secure computation data by the control unit.

In addition, in order to achieve the above described purpose, a conversion program for secure computation of the present disclosure makes the computer execute the above described conversion method for secure computation.

Effects of the Invention

By using the present disclosure, the input data can be converted into the input format applicable to the secure computation.

BRIEF DESCRIPTION OF THE DRAWINGS

FIGS. 4A and 4B are drawings showing an example of a learning model.

FIG. 5 is a drawing showing an example of a request condition data 35.

FIG. 7 is a drawing showing an example of an algorithm correspondence table 113.

FIG. 8 is a drawing showing an example of a score correspondence table 114.

FIG. 13 is a drawing for explaining a selection method of a combination conforming to an evaluation condition of the request condition data 35.

MODES FOR CARRYING OUT THE INVENTION

Hereafter, the embodiments of the present disclosure will be explained with reference to the drawings. In all drawings explaining the embodiments, the same reference signs are assigned to the common component to omit the repeated explanation. Note that the following embodiments do not unreasonably limit the content of the present disclosure described in the claims. In addition, all components disclosed in the embodiments are not necessarily essential components of the present disclosure.

First Example

Outline of First Embodiment

The secure computation system of the present embodiment is a system for executing the secure computation in the encrypted state. An object data of the secure computation is automatically converted into the secure computation data for the secure computation and then the secure computation is executed.

In recent years, the machine learning is performed for the sensitive data such as personal information and the data analysis is performed based on the generated learning model. On the other hand, it is preferred that the data analysis of the data such as the sensitive data requiring confidentiality is performed in the encrypted state. Conventionally, a software library is used in the machine learning and the secure computation. However, in order to apply the learning model generated by the AI library to the secure computation library, specialized knowledge about the secure computation and AI is required and it is not easy to use the existing library since reasonable conversion cost is required.

Accordingly, in the secure computation system of the present embodiment, the learning model generated by applying the data to the AI library is automatically converted into the input format applicable to the secure computation library. Thus, the data is applied to the secure computation library. Consequently, even when the user does not have highly specialized knowledge about the secure computation and AI, the computation process such as the data analysis based on the learning model can be performed while security is ensured by using the already existed library.

(Configuration of Secure Computation System 10)

Figure 1:
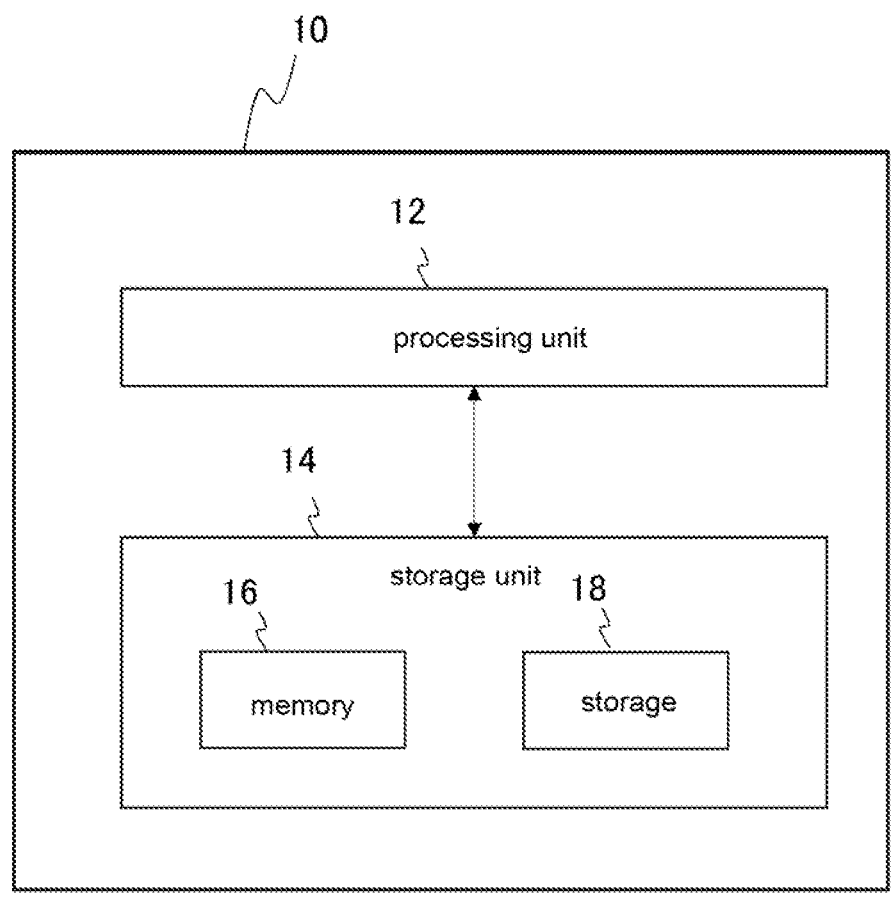
FIG. 1 is a schematic diagram of a secure computation system 10.

FIG. 1 is a schematic diagram of a secure computation system 10 of the present embodiment. The configuration of the secure computation system 10 concerning the first embodiment will be explained with reference to FIG. 1.

The secure computation system 10 is a computer system including a storage unit 14 which is functionally connected with a processing unit 12.

The processing unit 12 is one or more devices configured to execute commands for software and/or firmware. The processing unit 12 can include one or more computer processors and a distribution group of the computer processors.

The storage unit 14 is one or more devices configured to store computer readable information. The storage unit 14 includes a memory 16 and a storage 18. The storage 18 is one or more non-transitory computer readable storage devices which is not merely a transitory electrical signal and electromagnetic signal. The storage 18 can include one or more (non-transitory) storage media and/or a distribution group of (non-transitory) storage media.

The secure computation system 10 can include one or more computers, servers, work stations and the like. These are independent from each other and mutually connected with each other directly or indirectly (including a network connection). Accordingly, the secure computation system 10 can include the processor, the memory 16 and/or the storage 18 which are provided separately from each other.

The secure computation system 10 can be programmed to perform the method explained in the present specification or to store the commands (instructions) for performing the method. The storage unit 14 of the secure computation system 10 stores the commands. When the commands are executed by the processing unit 12, one or plurality of methods explained in the present specification is performed by the secure computation system 10.

The block diagrams, flow charts and the like explained in the present specification show realizable embodiments of the system, method and program by various exemplary embodiments. In this regard, each block of the block diagrams and flow charts may indicate a part of the module, segment or code, which is one or more executable commands for performing a predetermined one or plurality of logic functions. Note that the functions shown in the block in several alternative embodiments can be performed in the order different from the order shown in the drawings. For example, the functions of two sequential blocks can be simultaneously performed by substance or reversely performed in some functions.

(Functional Configuration of Secure Computation System 10)

Figure 2:
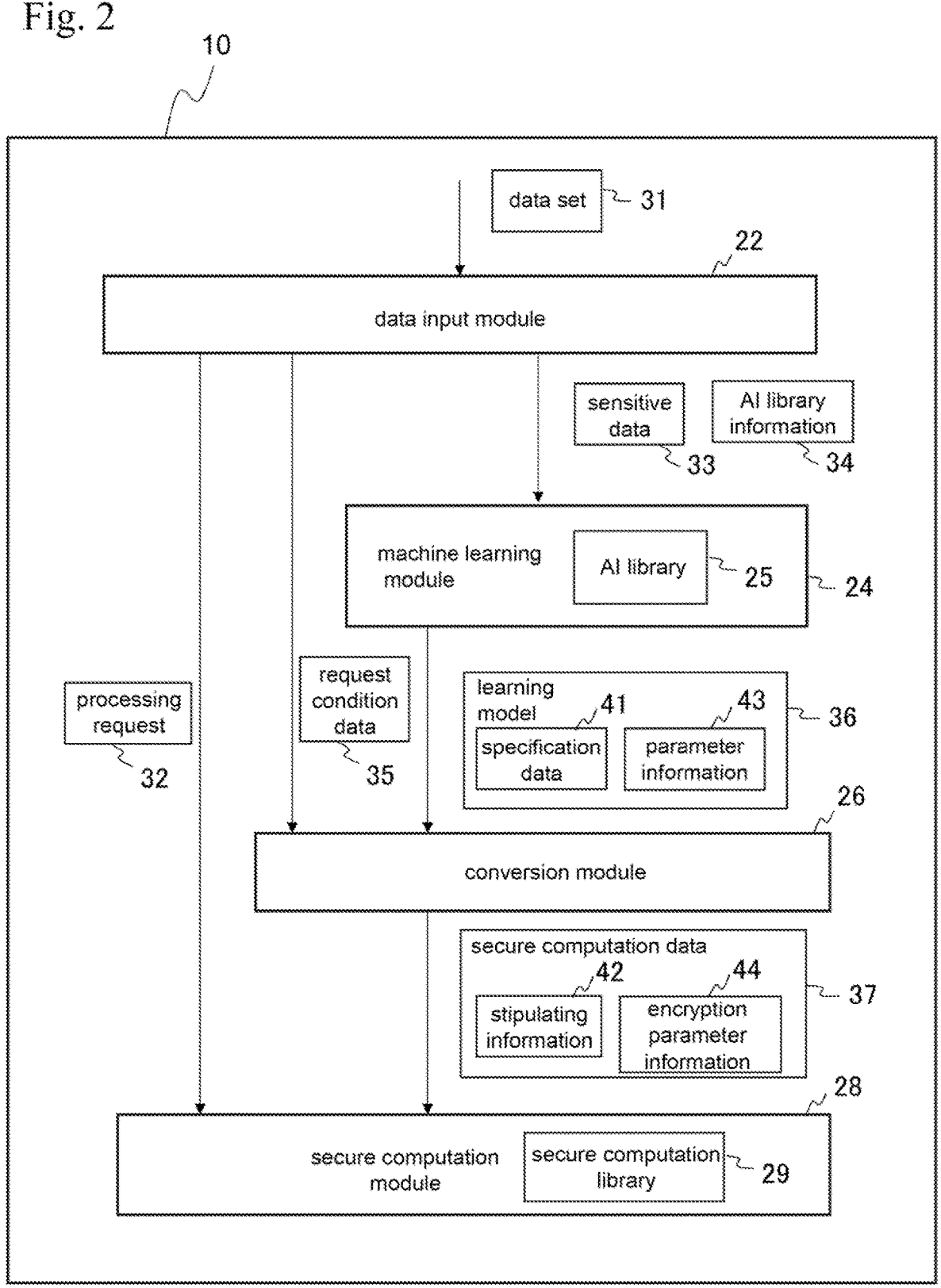
FIG. 2 is a configuration diagram showing modules in the secure computation system 10.

FIG. 2 is a configuration diagram showing modules in the secure computation system 10 of the present embodiment. The functional configuration of the secure computation system 10 will be explained with reference to FIG. 2. Note that the module generally indicates a logically separable component such as software (computer program, hereafter also referred to merely as "program") and hardware. Accordingly, the module in the present embodiment indicates not only a module of the program but also a module of the hardware configuration. Therefore, the present embodiment also explains the computer program (program for making computer execute each procedure, program for making computer function as each means, program for making computer achieve each function), system and method for functioning the module. Although the terms of "store" and "save" and the terms equivalent to these terms are used for the convenience of the explanation, these terms mean that the computer program makes the storage device store (save) the data or controls to make the storage device store (save) the data when the embodiment is the computer program. Although the module can correspond to the function one to one, one module can be formed by one program, a plurality of modules can be formed by one program or one module can be formed by a plurality of programs in the implementation. In addition, a plurality of modules can be executed by one computer or one module can be executed by a plurality of distributed computers or parallel computers. Note that one module can include the other modules. In addition, "connection" is used below for the logical connection (e.g., transmission/reception of data, instruction, reference relation between data) in addition to the physical connection. The term "preliminarily determined" means that the determination is made before the object process. Of course, "preliminarily determined" is used when the determination is made before the process of the present embodiment is started. In addition, it is also used even when the determination is made according to the current situation and condition or the past situation and condition after the process of the present embodiment is started as long as the determination is made before the object process.

In addition, the system or the device is configured by connecting a plurality of computers, hardware, devices and the like via the communication means such as a network (including communication connection in one-to-one correspondence) or achieved by one computer, hardware or device. The term "device" and the term "system" are used as synonymous with each other.

In addition, it is possible to read the object information from the storage device and the processing result is written in the storage device after the processing for each process of each module or for each process when a plurality of processes is performed in the module. Accordingly, the explanation may be omitted for the reading operation from the storage device before the processing and the writing operation to the storage device after the processing. Note that the storage device here can include a hard disk, a RAM (Random Access Memory), an external storage medium, a storage device connected through a communication line, a register in a CPU (Central Processing Unit) or the like.

In FIG. 2, the secure computation system 10 includes a data input module 22, a machine learning module 24, a conversion module 26 and a secure computation module 28. These modules are also called as an agent, a program, a process and a procedure. For example, these modules can include the commands and/or data stored in the storage unit 14 and executed by the processing unit 12.

The secure computation system 10 is configured to convert the learning model generated based on the AI library into the input format applicable to the secure computation library and perform the processes requested by the user based on the secure computation library.

The data input module 22 functions as "processing request unit." The data input module 22 is configured to receive a data set 31 from a (not-illustrated) user of the secure computation system 10. The data set 31 includes sensitive data 33 (corresponding to "first data") which is the object of the machine learning and includes AI library information 34 applied in the machine learning module 24.

The sensitive data 33 is a set of an input data and an output data corresponding to the input data. Enough number of sets required for the learning is included to function as a so-called teacher. Although the case where the teacher data is provided is explained in the present embodiment, the system of the present invention can be also applied for the case where the teacher data is not provided.

For example, the AI library information 34 can be the source code preliminarily created by using the AI library, the information for specifying the AI library (algorithm) to be applied in an AI library 25 stored in the machine learning module 24, the information of the parameter inputted in the algorithm, the information for specifying the method (e.g., decision tree, neural network) of the machine learning, the information of the parameter required for executing the method, and a combination of any of them.

In addition, the data set 31 includes a processing request 32 for requesting the processes such as a data analysis of a (later described) learning model 36 requested by the user and a (later described) request condition data 35 indicating the conditions of the secure computation specified by the user. Note that the timing of imputing the processing request 32 and the request condition data 35 in the data input module 22 can be different from the timing of imputing the sensitive data 33 and the AI library information 34.

The machine learning module 24 is configured to generate the learning model 36 based on the sensitive data 33 and the AI library information 34. In addition, the machine learning module 24 stores the AI library 25.

The AI library 25 includes a plurality of algorithms for the machine learning. For example, the algorithm is Keras, Tensor Flow, MXNet, Deeplearning4j, CNTK, Theano, ScikitLearn, NumPy, Scipy, Pandas and the like. It is preferred that each of the machine learning algorithms is configured to conform to a common interface so that the input data is easily applied to the machine learning algorithms. The common interface defines a common format for inputting/outputting data, a common procedure call for each of the machine learning algorithms and the like. For example, the machine learning algorithm is configured to function with respect to the data set in a common format (e.g., configuration of specified file format, configuration specifying row or column) for outputting parameter values in the same manner or performing the similar functions.

Accordingly, the machine learning algorithms of the AI library 25 can be used without discrimination in a similar manner. Namely, the input data is applied to the algorism similarly and the function is called similarly. Furthermore, the AI library 25 is extensible. The AI library 25 can be used by adding a new algorism.

When the AI library information 34 is the information for specifying the AI library to be applied in the AI library 25 or the information for specifying the method of the machine learning, the machine learning module 24 performs a pre-process to convert the sensitive data 33 into the format applicable to the AI library and then performs the machine learning.

The learning model 36 corresponds to the learning model (corresponding to "a second data which relates to a machine learning of a first data") generated by the machine learning performed for the sensitive data 33 in the machine learning module 24. The learning model 36 includes the combination of specification data 41 of the machine learning algorithms and parameter information 43. The specification data 41 is the information of the machine learning algorithms such as the information about the type of the algorism to be applied and layer information. When the algorism is CNN (Convolutional Neural Network), for example, the specification data 41 is the number of nodes and the layer information such as the first layer: convolutional layer, the second layer: activation layer, the third layer: pooling layer, the fourth layer: fully connected layer and the fifth layer: activation layer. When the algorism is the decision tree (random forest), for example, the specification data 41 is a tree depth (information required for ensemble learning such as the number of trees and gradient boost). For example, the decision tree is the information "depth: 3." The parameter information 43 is a parameter (weight) leaned by the machine learning algorithm. In case of CNN, for example, the parameter information 43 indicates weight coefficient (coupling coefficient) of each layer and the like. In case of the decision tree, for example, the parameter information 43 indicates the number of trees, the tree depth, the branch event of each node, the branch condition, the configuration information of the node and the like. Note that the above described specification data 41 and parameter information 43 are merely an example. It goes without saying that the specification data 41 and the parameter information 43 are not limited to the above described examples.

The conversion module 26 is configured to function as "secure computation conversion unit" to acquire the object data of the secure computation and convert it into a secure computation data. For example, the conversion module 26 converts the learning model 36 generated in the machine learning module 24 into the input format applicable to each algorithm of a secure computation library 29 in the secure computation module 28 and outputs it as the secure computation data 37.

The secure computation data 37 includes the specification data 41 and the stipulating information 42 indicating the input format of the optimum encryption method based on the request condition data 35. For example, the stipulating information 42 specifies the algorithm used in the machine learning, the parameter (layer information and architecture, i.e., layer structure and processing content of each layer) in the algorithm, (later described) option, the parameter of the encryption, type, scheme and granularity of the encryption, the encryption key and the like. The stipulating information 42 can be the source code for executing the secure computation. In addition, the secure computation data 37 includes encryption parameter information 44 obtained by encrypting the parameter information 43 by the optimum encryption method. The conversion module 26 will be explained in detail in FIG. 3.

The secure computation module 28 functions as "secure computation execution unit." The secure computation module 28 is configured to perform a predetermined computation processes (e.g., arithmetic operations, logical operations) in a state that the input data is encrypted. For example, the algorithms of homomorphic encryption (e.g., lattice encryption, Paillier encryption) and multi-party computation (e.g., Garbled circuit) are used in the present embodiment. These algorithms are the encryption technology capable of performing computation processes in a state that the data is encrypted. The secure computation module 28 stores the secure computation library 29.

The secure computation library 29 includes the algorithms for a plurality of secure computations. For example, HElib which is a representative library of the homomorphic encryption, SEAL, FV-NFlib, FHEW and the like can be listed. In addition, ObliVM and ABY which are libraries of multi-party computation can be listed, for example. Similar to the above described machine learning algorithms, it is preferred that each algorithm for the secure computation is configured to conform to a common interface so that the input data is easily applied to the algorithm for the secure computation. Furthermore, the secure computation library 29 is extensible. The secure computation library 29 can be used by adding a new algorism.

The secure computation module 28 selects the algorithm from the secure computation library 29 based on the secure computation data 37 outputted from the conversion module 26 and performs the computation based on the processing request 32.

(Functional Configuration of Conversion Module 26)

Figure 3:
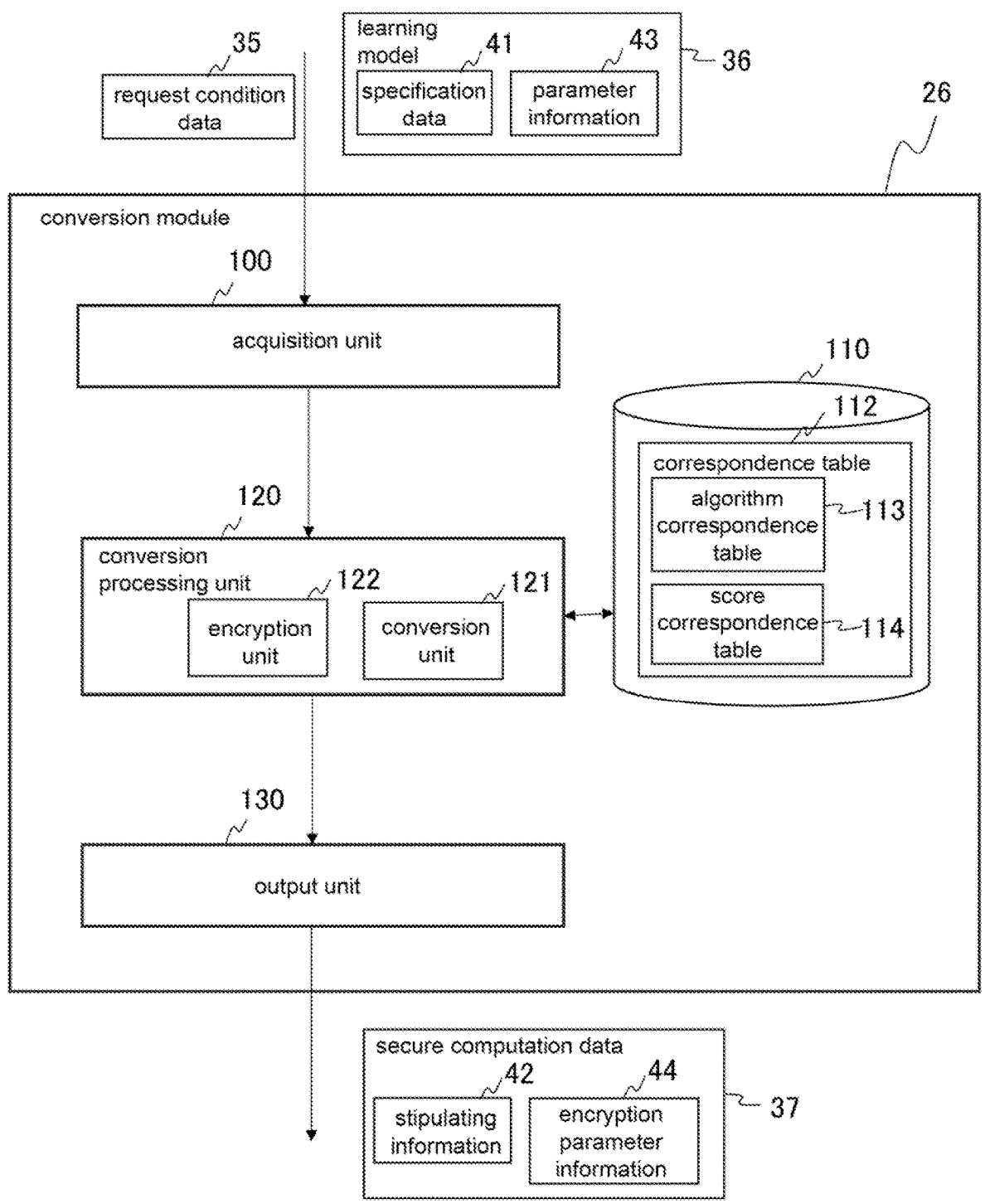
FIG. 3 is a block diagram showing a function configuration of a conversion module 26.

FIG. 3 is a block diagram showing a function configuration of the conversion module 26. The function configuration of the conversion module 26 will be explained with reference to FIG. 3.

The conversion module 26 corresponds to "conversion device for secure computation." The conversion module 26 includes an acquisition unit 100, a storage unit 110, a conversion processing unit 120 and an output unit 130.

The acquisition unit 100 is configured to acquire the object data of the secure computation. In the present embodiment, the object data is the above described learning model 36. The learning model 36 includes the specification data 41 and the parameter information 43. In addition, the acquisition unit 100 acquires the request condition data 35 indicating the conditions of the secure computation requested by the user of the secure computation system 10.

The request condition data 35 includes the selective condition related to the secure computation and/or a plurality of evaluation conditions to which scores are given. The selective condition related to the secure computation is one or a plurality of conditions related to the number of servers (architectures) executing the secure computation, for example. In addition, the evaluation conditions include conditions related to at least one of a processing speed, a security level and a cost. The request condition data 35 includes a combination of at least two evaluation conditions. The user can input the evaluation conditions via a graphical user interface (GUI) or input the evaluation conditions by a numerical value of ten-grade evaluation, for example.

The storage unit 110 stores a correspondence table 112 specifying the input format of the encryption method for executing the secure computation. The correspondence table 112 includes an algorithm correspondence table 113 and a score correspondence table 114. The algorithm correspondence table 113 is a table obtained by associating the information of the machine learning algorithms with one or a plurality of encryption methods which can be combined with the machine learning algorithms. In addition, the score correspondence table 114 is a table where scores are given to the type, scheme and the like of the encryption in the encryption method about the conditions requested by the user.

The conversion processing unit 120 is configured to convert the learning model 36 into the secure computation data 37 in accordance with the correspondence table 112. The conversion processing unit 120 includes a conversion unit 121 and an encryption unit 122. The secure computation data 37 includes stipulating information 42 and encryption parameter information 44.

More specifically, the conversion unit 121 converts the specification data 41 into the stipulating information 42 having the input format for the secure computation based on the correspondence table 112 and the request condition data 35. In addition, the encryption unit 122 encrypts the parameter information 43 by the encryption method specified in the input format. Thus, the encryption parameter information 44 is generated. Note that the encryption unit 122 acquires the key (public key) used for the encryption from a (not-illustrated) key management server and makes the information indicating the key used in the encryption be included in the stipulating information 42.

The output unit 130 outputs the secure computation data 37 converted in the conversion processing unit 120 to the secure computation module 28 (shown in FIG. 2).

(Data Structure)

Hereafter, the data structure of the above described data will be explained with reference to FIG. 4A to FIG. 10. FIGS. 4A and 4B are drawings showing an example of a learning model. FIG. 4A and FIG. 4B show examples of the learning model which are different from each other. As described above, the learning model is composed of the specification data and the parameter information.

In the example of FIG. 4A, specification data 401 includes the item "algorithm" and the item "layer information." As the "algorithm," "CNN (Convolutional Neural Network)" is written. As the "layer information," "first layer: convolutional layer," "second layer: activation layer," "third layer: pooling layer," "fourth layer: fully connected layer," and "fifth layer: activation layer" are written. Note that the layer information is not limited to the above described examples. The layer information includes the information related the computation such as the information of an activation function.

In addition, parameter information 403 includes the item "data file." The file name, the path and the like of the file including the parameters (e.g., weight coefficient) in the network acquired in the machine learning are written in the parameter information 403. In the example of FIG. 4A, the file name "weight03.param" is written.

In the example of FIG. 4B, specification data 411 includes the item "algorithm" and the item "tree depth." As the "algorithm," "decision tree" is written. As the "tree depth," "3" is written. As described above, the file name, the path and the like of the file including the parameters (e.g., branch event, branch condition) of the decision tree acquired in the machine learning are written in the parameter information 413. In the example of FIG. 4B, the file name "weight23.param" is written.

FIG. 5 is a drawing showing an example of the request condition data 35. The request condition data 35 is composed of a selective condition related to the secure computation and a plurality of evaluation conditions to which scores are given. In the example of FIG. 5, as the selective condition, the item "number of servers" is written as "2." As the evaluation conditions, the item "speed" is written as "8," the item "security level" is written as "4" and the item "cost" is written as "3." Although the number of the selective condition is one (only "number of servers") in the example of FIG. 5, a plurality of items can be specified as the selective condition.

The evaluation conditions are not limited to "speed," "security level" and "cost." Various evaluation conditions can be specified. In addition, each of the evaluation conditions is inputted by the user so that a larger value is given to the item having higher priority using ten-grade evaluation, for example. Note that the score to be given is not limited to the ten-grade evaluation. Any types of scores (evaluation) can be given as long as the priority can be distinguished. For example, the cost can be indicated by concrete amounts, computation resource, communication amount or the like and the security level can be specifically indicated as a security level (e.g., p-mark level, national secret level).

Figure 6:
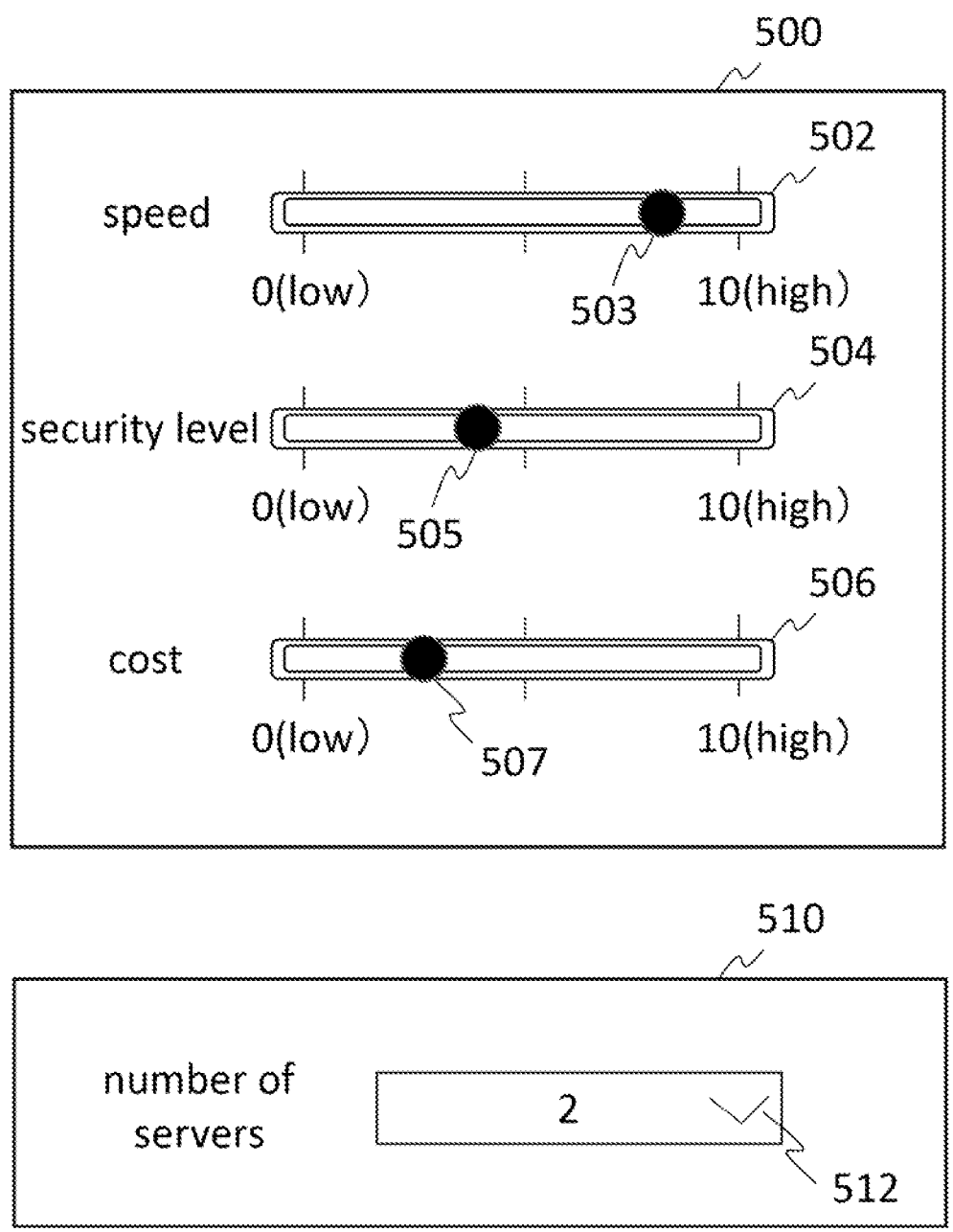
FIG. 6 is a drawing showing an example of an input screen of the request condition data 35.

FIG. 6 is a drawing showing an example of an input screen of the request condition data 35. In FIG. 6, an input screen 500 shows an example of the graphical user interface (GUI) for inputting the evaluation conditions of "speed," "security level" and "cost" related to the secure computation. A weighting of the conditions can be performed by slide bars 502, 504, 506. In the slide bars 502, 504 and 506, each of buttons 503, 505 and 507 are moved (slid) horizontally. For example, the weight is set to be smaller (priority is lower) as the button comes closer to the left end, while the weight is set to be larger (priority is higher) as the button comes closer to the right end. The example of FIG. 6 shows "speed: 8," "security level: 4" and "cost: 3." The user can specify the conditions flexibly by performing the weighting using the slide bars. This is effective for inputting the conditions.

In FIG. 6, an input screen 510 shows an example of the GUI for inputting the number of servers. An input pull-down 512 is a pull-down menu for selecting the number of servers. For example, "2" is selected by the input pull-down 512 when inputting the fact that the number of servers is two. Note that the interface for inputting the selective condition is not limited to the pull-down menu. It is also possible to use a radio button or a text input.

Note that the input method of the request condition data 35 is not limited to the above described GUI. It goes without saying that the other methods such as a command line interface (CLI) can be also used.

FIG. 7 is a drawing showing an example of the algorithm correspondence table 113. The algorithm correspondence table 113 includes an encryption table 602 indicating a plurality of encryption methods and a combination table 604 indicating combinations of the encryption methods applicable to the specification data of the machine learning algorithms.

The encryption table 602 includes the items "number (No.)," "encryption type," "encryption scheme," "encryption granularity," "architecture (number of servers)," "option (bootstrap)," "option (garbled circuit)," "option (loss communication)" and the like. Note that the above described items are merely examples. Other items than the above described items can be also included.

The item "number" is a later described identifier for identifying the encryption method indicated by the combination of "encryption type," "encryption scheme," "encryption granularity," "architecture (number of servers)," "option (bootstrap)," "option (garbled circuit)" and "option (loss communication)."

The item "encryption type" indicates the type of the encryption. For example, the item "encryption type" is the lattice encryption, the Paillier encryption, the TFHE encryption and the like.

The item "encryption scheme" indicates the scheme in each of the above described encryption types. The item "encryption scheme" is classified by the operable number of multiplications, the matter of the base of the encryption, the expression form of the encrypted text and the like. For example, in case of the lattice encryption, there are BGV scheme, HEAAN scheme, GSW scheme and the like.

The item "encryption granularity" is a unit of the data to be encrypted. For example, the item "encryption granularity" is per bit, per number, per vector and the like.

The item "architecture (number of servers)" indicates the number of servers executing the secure computation. The item "architecture (number of servers)" is show by 1 or the number larger than 1.

The item "option (bootstrap)" indicates whether or not the bootstrapping is applied. The bootstrapping is the method of eliminating the noise added to the encrypted text in each computation of the lattice encryption.

The item "option (garbled circuit)" indicates whether or not the garbled circuit is applied. When the garbled circuit is applied, the computation is divided into computation circuits and encrypts them to perform the computation in a plurality of servers.

The item "option (loss communication)" indicates whether or not the loss communication is applied. When the loss communication is applied, the data is exchanged while each server conceals the information.

The encryption methods formed by combining the above described items have merits and demerits. For example, space complexity decreases although time complexity increases, or computation speed decreases although the upper limit of the number of times of multiplication is not small. Thus, an optimum encryption method is determined based on the specification data of the machine learning algorithms and the request conditions inputted by the user. The determination method will be described later.

In FIG. 7, the number "1" of the encryption table 602 indicates "encryption type: lattice encryption," "encryption scheme: BGV," "encryption granularity: vector," "architecture (number of servers): 2," "option (bootstrap): disable," "option (garbled circuit): enable" and "option (loss communication): enable." The above described combination is a hybrid type encryption method of the homomorphic encryption and the secret distribution.

The number "2" of the encryption table 602 indicates "encryption type: lattice encryption," "encryption scheme: HEAAN," "encryption granularity: matrix," "architecture (number of servers): 3," "option (bootstrap): enable," "option (garbled circuit): disable" and "option (loss communication): enable." The above described combination is an encryption method of the homomorphic encryption.

The number "3" of the encryption table 602 indicates "encryption type: —(NULL)," "encryption scheme: —(NULL)," "encryption granularity: —(NULL)," "option (bootstrap): —(NULL)," "architecture (number of servers): 3," "option (garbled circuit): enable" and "option (loss communication): disable." The above described combination is an encryption method of the secret distribution.

The number "4" of the encryption table 602 indicates "encryption type: Paillier," "encryption scheme: —(NULL), "encryption granularity: element," "architecture (number of servers): 1," "option (bootstrap): disable," "option (garbled circuit): —(NULL)," and "option (loss communication): enable."

The combination table 604 includes the items "algorithm," "layer (number of times of multiplication)," "activation layer" and "combinable encryption method number." Note that the above described items are merely examples. The other items than the above described items can be also included.

The item "algorithm" indicates the name of the algorithm used in the machine learning. The item "layer (number of times of multiplication)" indicates the total number of the multiplication performed in a linear transformation layer. The item "activation layer" indicates an activation function. The item "combinable encryption method number" indicates the numbers of the encryption method combinable with the above described machine learning algorithms of "algorithm," "layer (number of times of multiplication)" and "activation layer" in the encryption methods shown in the encryption table 602.

In FIG. 7, the machine learning algorithm indicated by "algorithm: NN (neural network)," "layer (number of times of multiplication): 10 or more" and "activation layer: ReLU" in the combination table 604 can be combined with the encryption methods of the numbers "1," "2," "3" and "4" in the encryption table 602.

The machine learning algorithm indicated by "algorithm: NN (neural network)," "layer (number of times of multiplication): less than 10" and "activation layer: ReLU" in the combination table 604 can be combined with the encryption methods of the numbers "1" and "2" in the encryption table 602.

The machine learning algorithm indicated by "algorithm: NN (neural network)," "layer (number of times of multiplication): 10 or more" and "activation layer: Tanh" in the combination table 604 can be combined with the encryption methods of the numbers "3," "4," "5" and "6" in the encryption table 602 (the numbers "5" and "6" are not illustrated in the encryption table 602).

The machine learning algorithm indicated by "algorithm: decision tree," "layer (number of times of multiplication): less than 10" and "activation layer: —(NULL)" in the combination table 604 can be combined with the encryption methods of the numbers "11" to "13" in the encryption table 602 (the numbers "11" to "13" are not illustrated in the encryption table 602).

FIG. 8 is a drawing showing an example of the score correspondence table 114. The above described items in the encryption table 602 are associated with the processing speed of the computation, the security level and the cost.

For example, the scores are preliminarily given to each of "speed," "security level" and "cost" by a system developer based on the features of the combination of the items of "encryption type" and "encryption scheme." In the example of FIG. 8, as for the combination 801 of "encryption type: lattice" and "encryption scheme: BGV," the scores are given as "speed: 4," "security level: 8" and "cost: 5." This indicates that the encryption method is inferior in the speed but superior in the security level. In the combination 804 of "encryption type: Paillier" and "encryption scheme: —(NULL)," the scores are given as "speed: 9," "security level: 4" and "cost: 5." This indicates that the encryption method is superior in the computation speed.

Similarly, the scores are added to "speed," "security level" and "cost" in each of the combinations 811 to 815 of the items "encryption granularity" and "encryption scheme" and each of the options 821 to 824. Although not illustrated in FIG. 8, the scores can be also given to the secret distribution.

Figure 9:
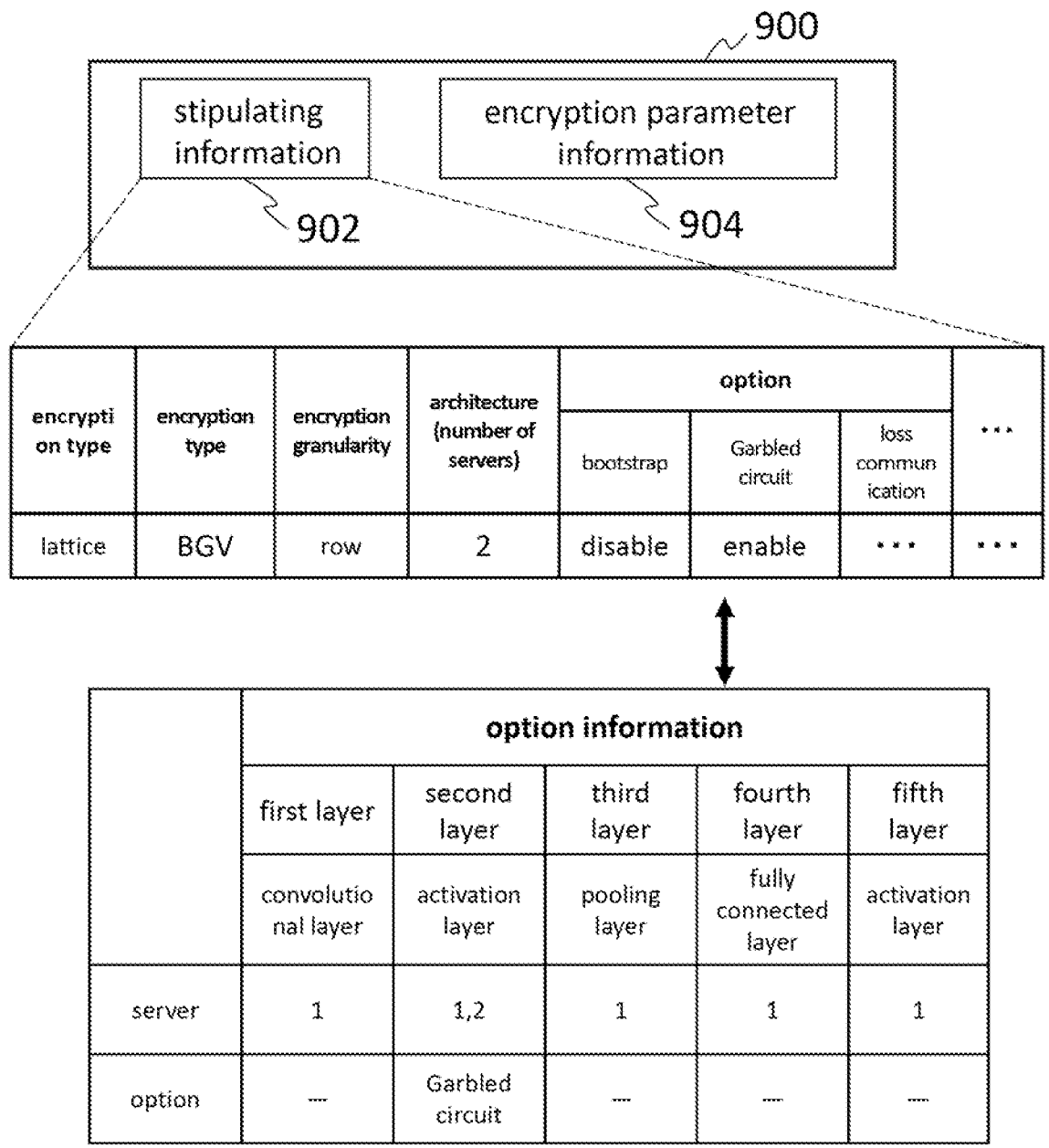
FIG. 9 is a drawing showing an example of a secure computation data 37.

FIG. 9 is a drawing showing an example of the secure computation data 37. In FIG. 9, secure computation data 900 is the secure computation data obtained by converting the learning model shown in FIG. 4A, for example.

The secure computation data 900 is composed of stipulating information 902 and encryption parameter information 904. In the example of FIG. 9, the stipulating information 902 indicates the combination (encryption method) extracted from the encryption table 602 based on the request condition data 35, the specification data 41 and the like and the option information for performing the options associated with the combination. The stipulating information 902 also includes the layer information, the architecture (layer structure and processing content of each layer), (not-illustrated) parameter used for the encryption and (not-illustrated) information of the key used for the encryption. Namely, the stipulating information 902 indicates the data depending on the input format for executing the secure computation.

In the example of FIG. 9, the extracted combination is formed by the configurations "encryption type: lattice encryption," "encryption scheme: BGV," "encryption granularity: row," "architecture (number of servers): 2," "option (bootstrap): disable" and "option (garbled circuit): enable." This is a hybrid type secure computation formed by combining the lattice encryption and the garbled circuit. In the example of FIG. 9, it is indicated that the option (garbled circuit) is performed in the second layer of the computational procedures shown as the option information. The conditions of applying the "option" are preliminarily specified so that the "option" is applied to the layer in which the complexity (amount of computation) increases when using the homomorphic encryption or the layer in which the computation cannot be fundamentally executed. For example, since the complexity (number of multiplication) may become large depending on the type (e.g., sigmoid) of the activation layer, the garbled circuit is applied as the "option" when the complexity is more than the predetermined amount. In addition, the "option" is applied to the layer of the activation function such as ReLu and the layer of the max pooling because the comparison computation is required and the homomorphic encryption cannot be fundamentally performed. As for the activation layer and the pooling layer which do not include the comparison computation, it is possible to specify the conditions of applying the "option" based on the complexity. As for the linear layers such as the fully connected layer, the "option" is not applied in principle. Note that it is possible to make the user determine whether or not the "option" is applied as necessary.

The parameter information (weight) included in the learning model is encrypted in the encryption unit 122 in accordance with the stipulating information 902 and converted into the encryption parameter information 904.

Figure 10:
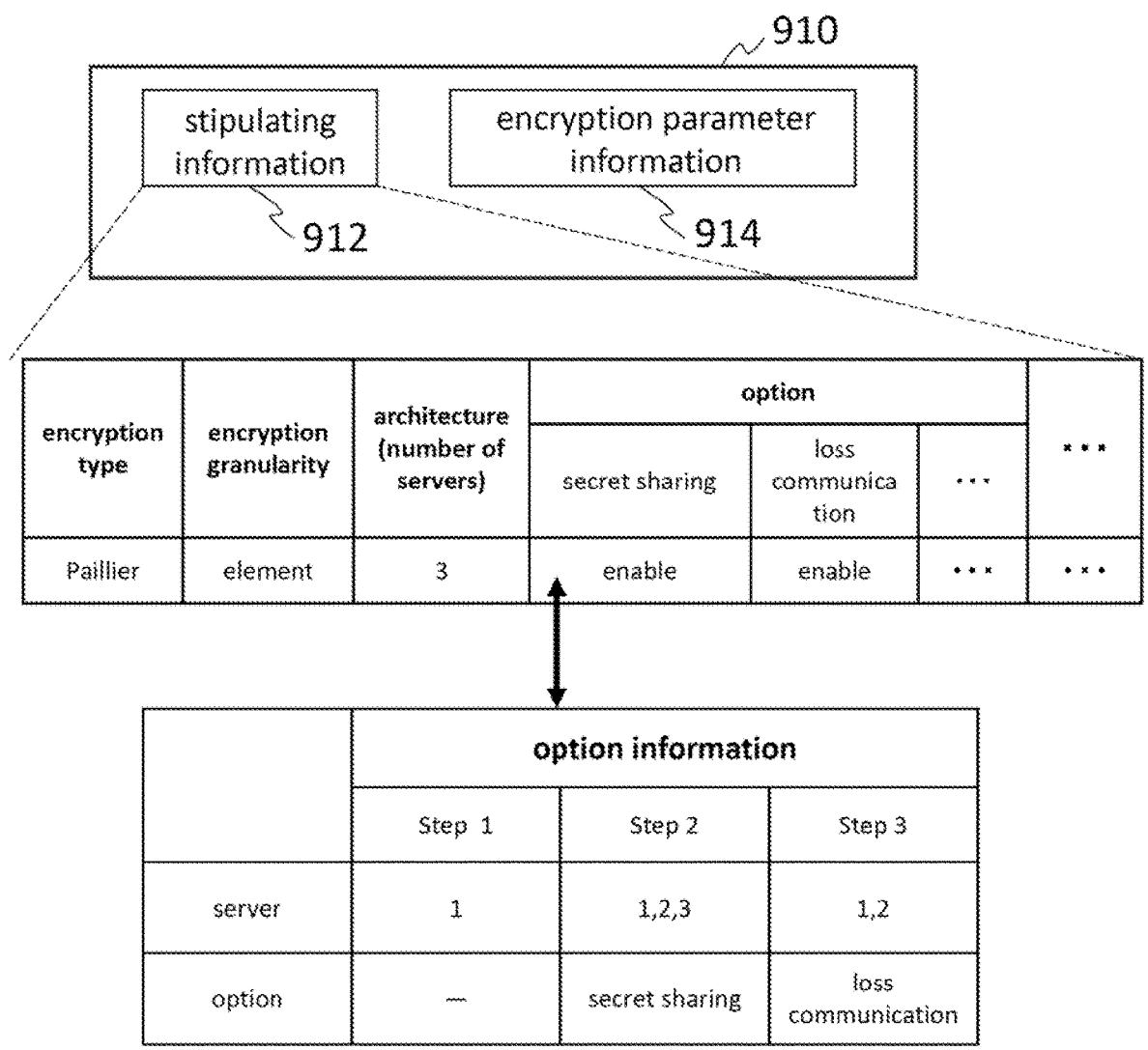
FIG. 10 is a drawing showing another example of the secure computation data 37.

FIG. 10 is a drawing showing another example of the secure computation data 37. In FIG. 10, secure computation data 910 is the secure computation data obtained by converting the learning model shown in FIG. 4B, for example.

The secure computation data 910 is composed of stipulating information 912 and encryption parameter information 914. In the example of FIG. 10, the stipulating information 912 indicates the combination (encryption method) extracted from the encryption table 602 based on the request condition data 35, the specification data 41 or the like and the option information for performing the options associated with the combinations. The stipulating information 912 also includes the layer information, the architecture (layer structure and processing content of each layer), (not-illustrated) parameter used for the encryption and (not-illustrated) information of the key used for the encryption. Namely, the stipulating information 912 indicates the data depending on the input format for executing the secure computation.

In the example of FIG. 10, the extracted combination is formed by the configurations "encryption type: Paillier," "encryption granularity: element," "architecture (number of servers): 3," "option (secret sharing): enable" and "option (loss communication): enable." This is a hybrid type secure computation formed by combining the Paillier encryption and the loss communication. In the example of FIG. 10, in the computational procedures shown as the option information, the "secret sharing" is performed among the servers 1, 2 and 3 in Step 2 and the "loss communication" is performed between the servers 1 and 2 in Step 3. Since the "secret sharing" of the "option" is performed in a plurality of servers, when the architecture (number of servers) is determined, how the information is divided by the plurality of servers is preliminarily specified to perform the "option" based on the preliminarily specified conditions. It is possible to make the user specify the number of serves required for performing the "option" as the selective condition or preliminarily specify it based on the "option."

The parameter information included in the learning model is encrypted by the encryption unit 122 in accordance with the stipulating information 912 and converted into the encryption parameter information 914.

The data structure treated in the secure computation system 10 is explained above.

Figure 11:
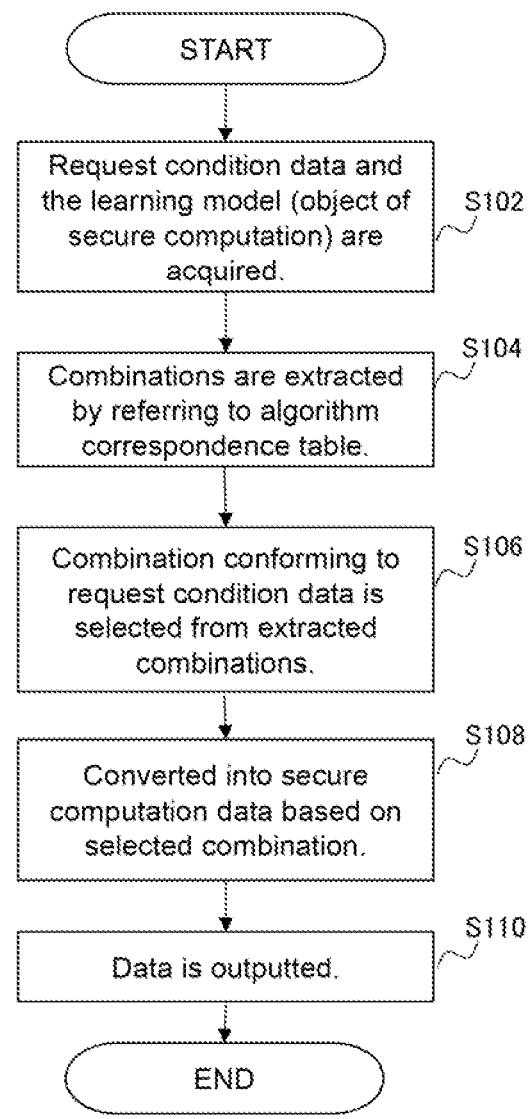
FIG. 11 is a flow chart showing an example of the processes of the conversion module 26.

FIG. 11 is a flow chart showing an example of the processes of the conversion module 26. The processes in the conversion module 26 will be explained with reference to FIG. 11 and FIG. 3.

In Step S102, the acquisition unit 100 acquires the request condition data 35 and the learning model 36. The learning model 36 is the object data of the secure computation executed in the secure computation module 28. The acquisition unit 100 transmits the acquired request condition data 35 and the learning model 36 to the conversion processing unit 120.

In Step S104, the conversion unit 121 of the conversion processing unit 120 extracts the combinations of the encryption methods applicable to the specification data 41 included in the learning model 36 by referring to the algorithm correspondence table 113 (encryption table 602 and combination table 604) of the storage unit 110.

In Step S106, the conversion unit 121 refers to the request condition data 35 and the score correspondence table 114 to select the combination of the encryption methods conforming to the request condition data 35 from the combinations extracted in Step S104. The method of selecting the combination of the encryption methods conforming to the request condition data 35 will be described later with reference to FIG. 12 and FIG. 13.

In Step S108, the conversion unit 121 converts the learning model 36 into the secure computation data 37 based on the combination of the encryption methods selected in Step S106. Namely, the specification data 41 is converted into the stipulating information 42. In addition, the encryption unit 122 encrypts the parameter information 43 in accordance with the selected encryption methods. Thus, the encryption parameter information 44 is formed.

In Step S110, the output unit 130 outputs the secure computation data 37 including the stipulating information 42 and the encryption parameter information 44.

Figure 12:
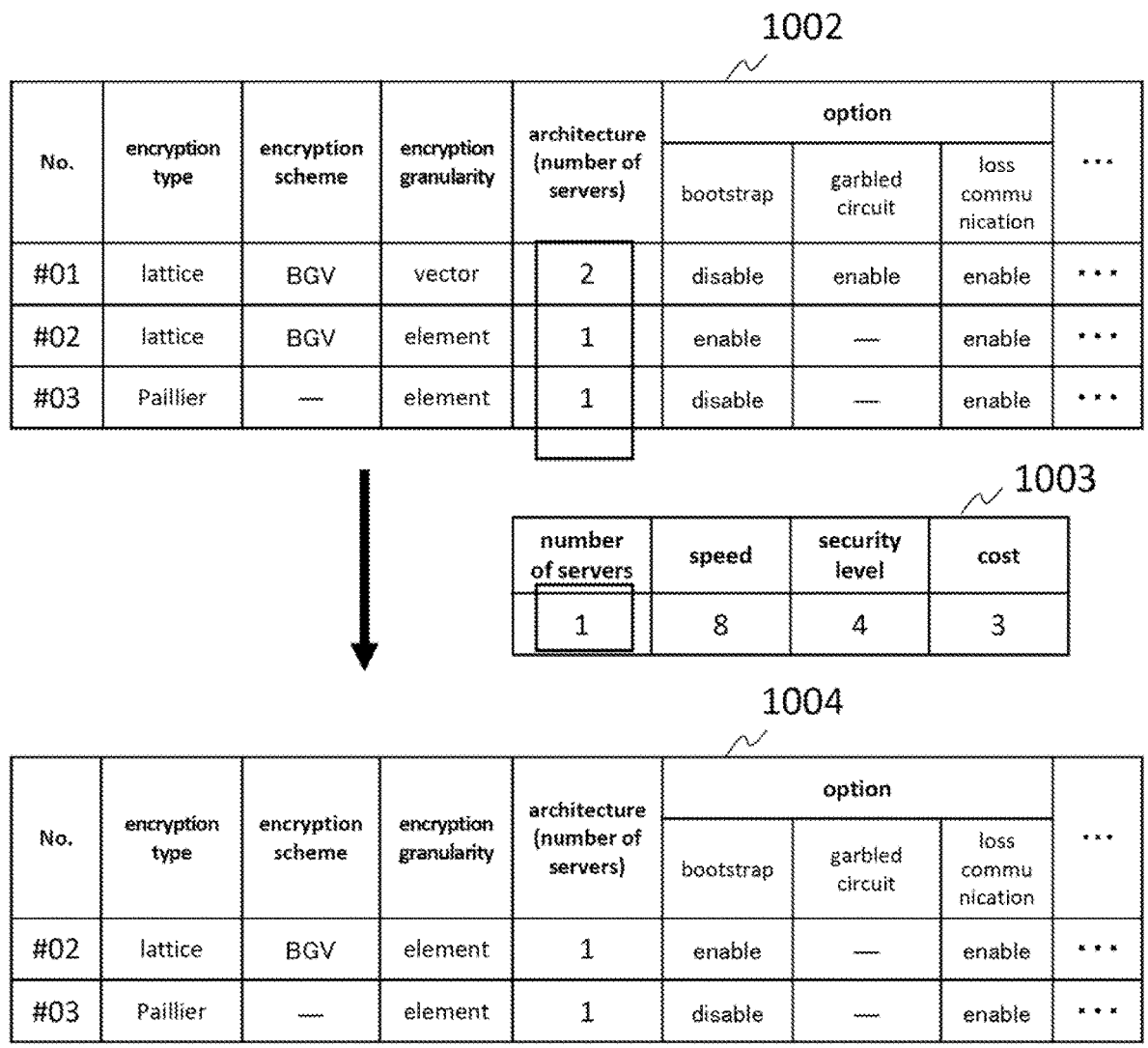
FIG. 12 is a drawing for explaining a selection method of a combination conforming to a selective condition of the request condition data 35.

FIG. 12 is a drawing for explaining the selection method of the combination conforming to the selective condition of the request condition data 35. In FIG. 12, lists 1002, 1004 and request condition data 1003 are shown.

For example, the list 1002 indicates the combinations of the encryption methods extracted by referring to the algorithm correspondence table 113 (encryption table 602 and combination table 604) in Step S104 of FIG. 11. Namely, the applicable encryption methods are extracted from the encryption table 602 by referring to the combination table 604 based on the specification data. The encryption methods are identified by "#01," "#02" and "#03."

The scores are added to the request condition data 1003. For example, "number of servers: 1" is added as the selective condition from the user and "speed: 8," "security level: 4" and "cost: 3" are added as the evaluation conditions.

In the list 1004, the encryption methods conforming to the selective condition of the request condition data 1003 is extracted from the encryption methods of the list 1002. Namely, "number of servers" is focused in the request condition data 1003 since it is the selective condition. In the encryption methods of the list 1002, the number of servers is "2" in the number "#01." The number "#01 does not conform to the number of servers "1" requested by the user. Thus, the encryption method shown as the number "#01" is eliminated. Accordingly, the combinations of the number "#02" and the number "#03" conforming to the selective condition are extracted in the list 1004. It is also possible to extract the combinations by specifying a certain range for the number (of the serves) conforming to the selective condition. For example, it is possible to extract the combination of the number "#01," the number "#02" and the number "#03" by specifying the number of the servers in the range "±1" of the selective condition "1" requested by the user in FIG. 12. Consequently, flexibility can be added to the selecting method of the combinations.

Next, the method of selecting the combination of the encryption methods based on the evaluation conditions of the request condition data 1003 from the combinations of the encryption methods extracted in FIG. 12 will be explained.

FIG. 13 is a drawing for explaining the selection method of the combination conforming to the evaluation condition of the request condition data 35. As described in the explanation of FIG. 8, the scores of the speed, the security level and the cost are preliminarily given to each encryption type/scheme, encryption granularity/scheme and option in the score correspondence table 114 using ten-grade evaluation based on the features (e.g., by a developer or by machine learning). As for the encryption methods of each combination in the list 1004, the scores are calculated in accordance with the evaluation conditions of the request condition data 1003 from the user based on the score correspondence table 114. Thus, the encryption method having the highest score is selected as the optimum encryption method.

As an example, the method of calculating the score of the number "#02" shown in FIG. 13 will be specifically explained. As illustrated, the scores of "speed," "security level" and "cost" are given to the combinations 801, 811 of "encryption type," "encryption scheme" and "encryption granularity" and the options 821, 822. A weight average obtained by weighing each of the above described scores by the evaluation conditions of the user is treated as "score" of the encryption method. Note that the method of giving the scores explained in FIG. 13 is merely an example. It goes without saying that the method of giving the scores is not limited to the above described method.

For example, as for the "speed," the evaluation condition of the user is "8." In addition, the "speed" is "4" for the combination of "encryption type: lattice" and "encryption scheme: BGV," the "speed" is "4" for "encryption granularity: element," the "speed" is "2" for the "option: bootstrap" and the "speed" is "5" for the "option: loss communication." Accordingly, the weight average of the "speed" is "8/10×(4+4+2+5)/4=3" as illustrated. Similarly, the "security level" and the "cost" are calculated. The sum "7.3" of the computation result of the "speed," "security level" and "cost" is the score of the number "#02."

Similarly, when the weight average of the encryption method of the number "#03" is calculated, the score is "8.0." When the scores of the number "#02" and the number "#03" are compared, the score of the number "#03" is larger. Accordingly, in the example of FIG. 13, the encryption method of the combination of the number "#03" is selected as the encryption method satisfying the request condition data 35.

(Explanation of Effects)

As described above, a secure computation system of the present embodiment automatically converts the learning model generated by being applied to the AI library into the input format applicable to the secure computation library. Thus, the input format is applied to the secure computation library. Consequently, even if the user does not have highly specialized knowledge related to the secure computation and AI, the computation processes such as a data analysis can be performed based on the learning model while security is ensured by using the already existed library.

Second Example

Outline of Second Embodiment

In the conversion module of the secure computation system of the first embodiment, the learning model generated by the machine learning is converted into the input format applicable to the secure computation library. On the other hand, in the conversion module of the secure computation system of the present embodiment, the sensitive data (raw data) and the information (specification data) of the machine learning executed in a secure computation module are converted into the input format applicable to the secure computation library. Consequently, even if the user does not have highly specialized knowledge, the machine learning of the sensitive data can be performed by using the existing secure computation library while ensuring the security. In addition, the computation processing such as a data analysis can be performed based on the learning model generated by the machine learning. Since the learning model can be generated in a state that the sensitive data is encrypted, the data can be treated in a highly secured environment.

Figure 14:
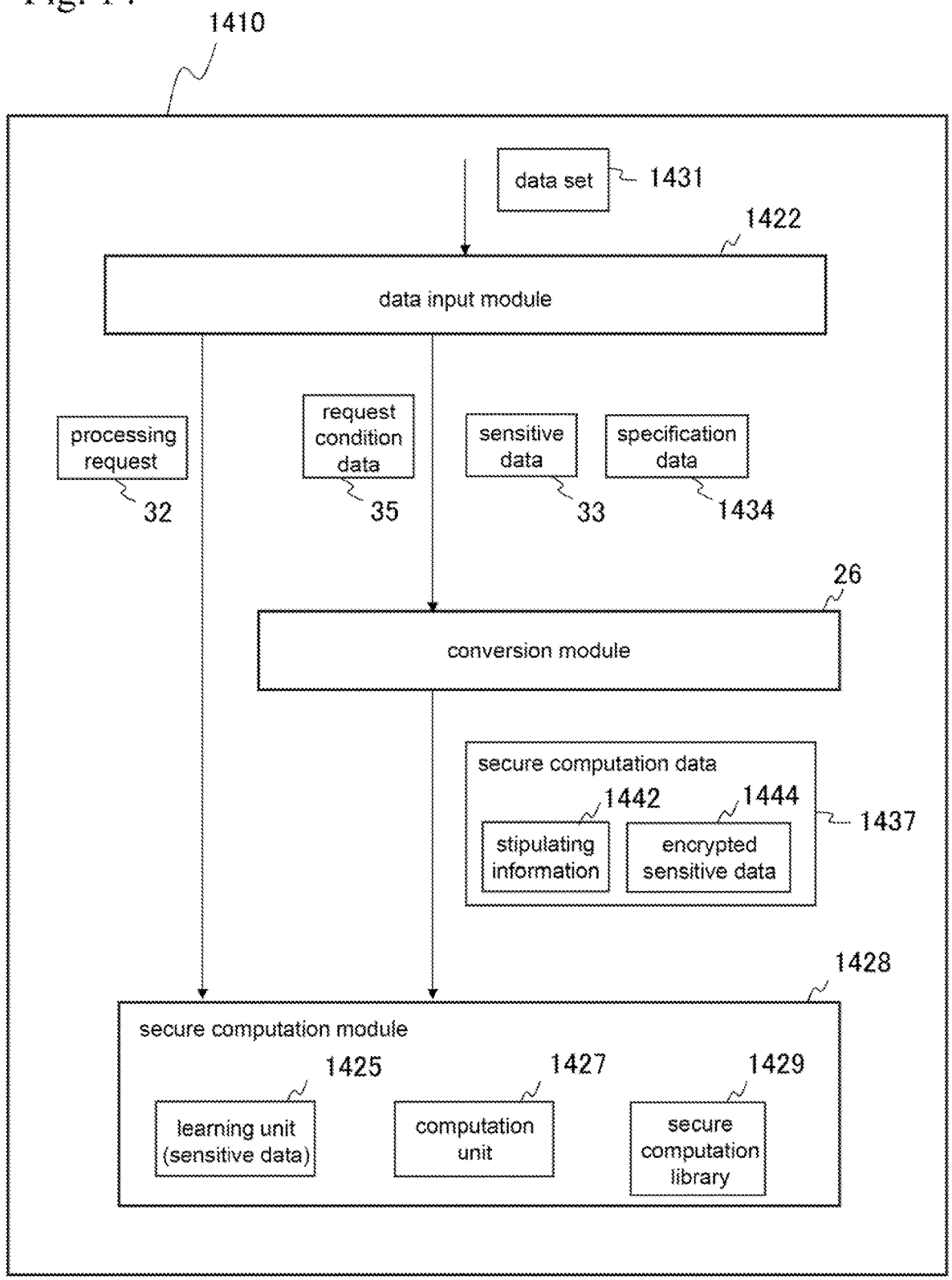
FIG. 14 is a configuration diagram showing modules in a secure computation system 1410.

FIG. 14 is a configuration diagram showing modules in a secure computation system 1410 of the second embodiment. In FIG. 14, the secure computation system 1410 includes a data input module 1422, a conversion module 26 and a secure computation module 1428. Note that the same reference signs are added to the configurations in common with FIG. 2 and the explanation of these configurations will be omitted.

The secure computation system 1410 converts the sensitive data on which the machine learning is to be performed and the information of the machine learning into the input format applicable to the secure computation library. Then, the machine learning is performed based on the secure computation library to generate the learning model. Thus, the processing such as the data analysis requested from the user can be performed.

The data input module 1422 functions as "processing request unit." The data input module 1422 is configured to receive data set 1431 from a (not-illustrated) user of the secure computation system 1410. The data set 1431 includes the sensitive data 33 which is the object of the machine learning and the specification data 1434 of the machine learning. In addition, the data set 1431 includes the processing request 32 of the secure computation module 1428 requested from the user and the request condition data 35 for the secure computation.

The specification data 1434 is the source code (binary file) generated by using the machine learning library or the information of the algorithms and parameters used for the machine learning. The specification data 1434 also includes an optimum algorithm (e.g., SGD, Adam) used for the learning and a learning ratio (number between 0 and 1).

The conversion module 26 converts the specification data 1434 into stipulating information 1442 based on the correspondence table 112. In the combination table 604 (shown in FIG. 7), the items indicating the optimum algorithm and the like used for the learning are included, for example. The stipulating information 1442 defines the algorithms used for the machine learning, the parameters (layer information and architecture, i.e., layer structure and processing content of each layer) in the algorithms, the options, the parameters of the encryption, the encryption type, the encryption scheme, the encryption granularity, the encryption key, the optimum algorithms used for the learning and the learning rate, for example.

In addition, the encryption unit 122 encrypts the sensitive data 33 to generate encrypted sensitive data 1444 in accordance with the encryption method defined in the stipulating information 1442. Namely, the conversion module 26 converts the sensitive data 33 and the specification data 1434 into secure computation data 1437 including the stipulating information 1442 and the encrypted sensitive data 1444. Note that the sensitive data 33 can be configured to be encrypted by the secure computation module 1428 in accordance with the encryption method defined in the stipulating information 1442 instead of being encrypted by the conversion module 26.

The secure computation module 1428 includes a learning unit 1425, a computation unit 1427 and a secure computation library 1429. The learning unit 1425 applies the secure computation library 1429 based on the stipulating information 1442. Thus, the machine learning is performed for the encrypted sensitive data 1444. In addition, the computation unit 1427 performs the computation processing such as a data analysis in accordance with the processing request 32 based on the learning model generated by the machine learning.

(Explanation of Effects)

As described above, in the present embodiment, the sensitive data (raw data) and the information (specification data) of the machine learning performed in the secure computation module are converted into the input format applicable to the secure computation library. Even if the user does not have highly specialized knowledge, the machine learning of the sensitive data can be performed by using the existing secure computation library. Since the learning model can be generated in a state that the sensitive data is encrypted, the data can be treated in a highly secured environment.

Third Embodiment

Outline of Third Embodiment

In the secure computation system of the first and second embodiments, the conversion module refers to the algorithm correspondence table and selects the optimum combination of the encryption methods from the extracted combinations of the encryption methods in accordance with the scores calculated based on the request condition data and the score correspondence table. On the other hand, the conversion module of the secure computation system of the present embodiment stores the combination of the request condition data and the selected combination of the encryption method as the learning data and generates the learning model which learns the relative relation between the request condition data and the combination of the encryption methods. Thus, the generated learning model is used instead of the score correspondence table, and the optimum combination of the encryption methods are selected from the extracted combinations of the encryption methods by referring to the algorithm correspondence table without calculating the scores. Since the optimum combination of the encryption methods can be selected without calculating the scores, the amount of computation can be reduced. In addition, more flexible and stochastic selection is possible compared to the decisive selection based on the scores. Thus, the method more suitable for the algorithm, the data, the demand of the user and the like can be selected.

Figure 15:
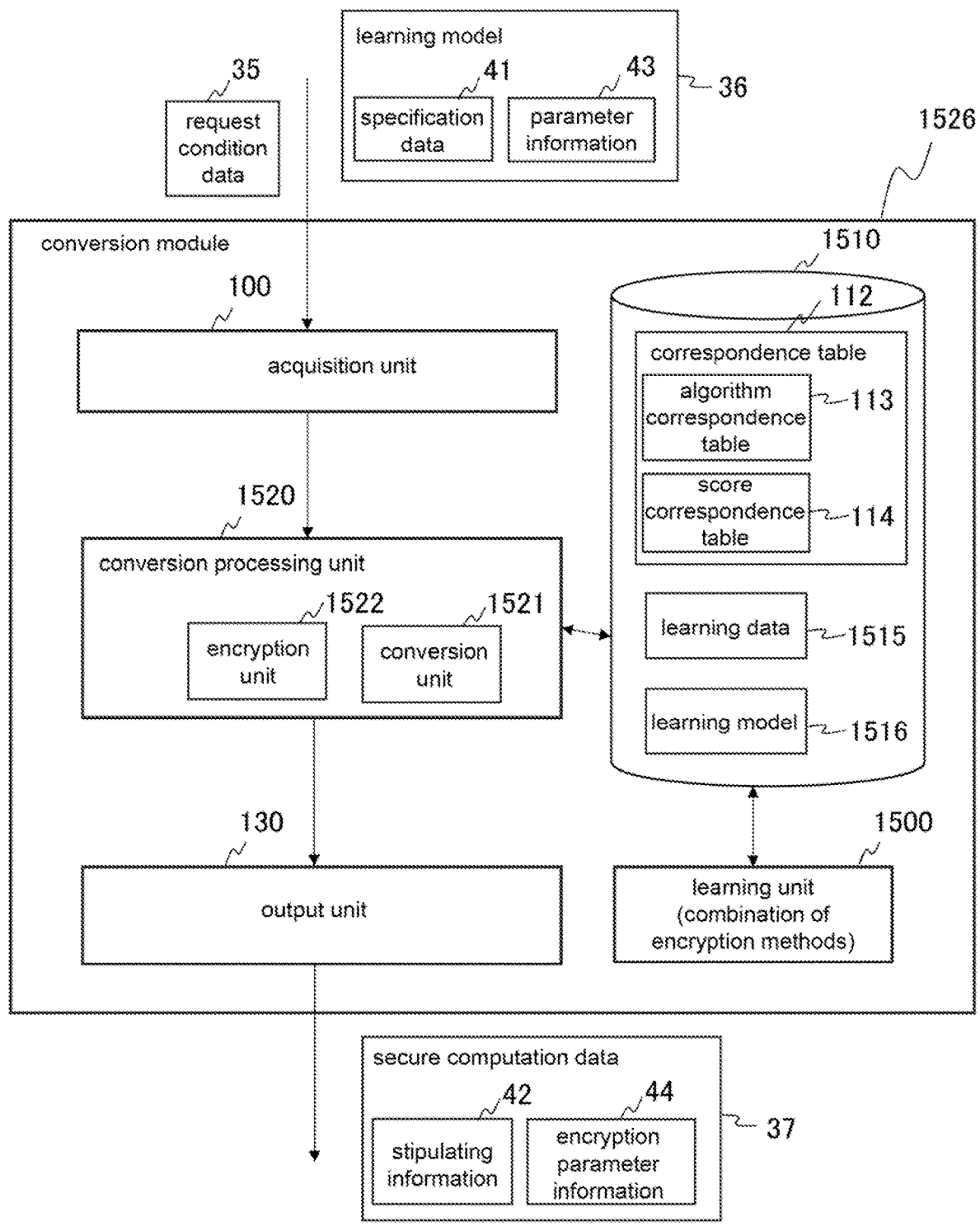
FIG. 15 is a functional block diagram of a conversion module 1526.

FIG. 15 is a functional block diagram of a conversion module 1526 of the third embodiment. The conversion module 1526 shown in FIG. 15 includes a conversion processing unit 1520 and a learning unit 1500. A storage unit 1510 stores learning data 1515 and learning model 1516. Namely, the configuration for selecting the combination of the encryption methods is different from that of the conversion module 26 of the secure computation system 10. Note that the same reference signs are added to the configurations in common with FIG. 3 and the explanation of these configurations will be omitted.

The conversion processing unit 1520 includes an encryption unit 1522 and a conversion unit 1521.

In the learning data 1515, the request condition data 35 is stored while being paired with the selected optimum combination of the encryption methods based on the request condition data 35.

The learning unit 1500 learns the relative relation (explained in detail in FIG. 16) between the request condition data (in particular, evaluation conditions) and the combination of the encryption methods selected by the conversion unit 1521 based on the learning data 1515 and stores the learning result in the learning model 1516. Note that the relative relation can be learned based on the combination selected by the user (a person having specialized knowledge of the secure computation) or the like instead of the combination of the encryption method selected by the conversion unit 1521 depending on the request condition data.

As described above, the learning model 1516 is the data indicating the relative relation between the request condition data 35 and the combination of the encryption methods. As for the combinations of the encryption methods extracted based on the algorithm correspondence table 113, the conversion unit 1521 selects the combination of the optimum encryption methods based on the learning model 1516 instead of the score correspondence table 114.

Figure 16:
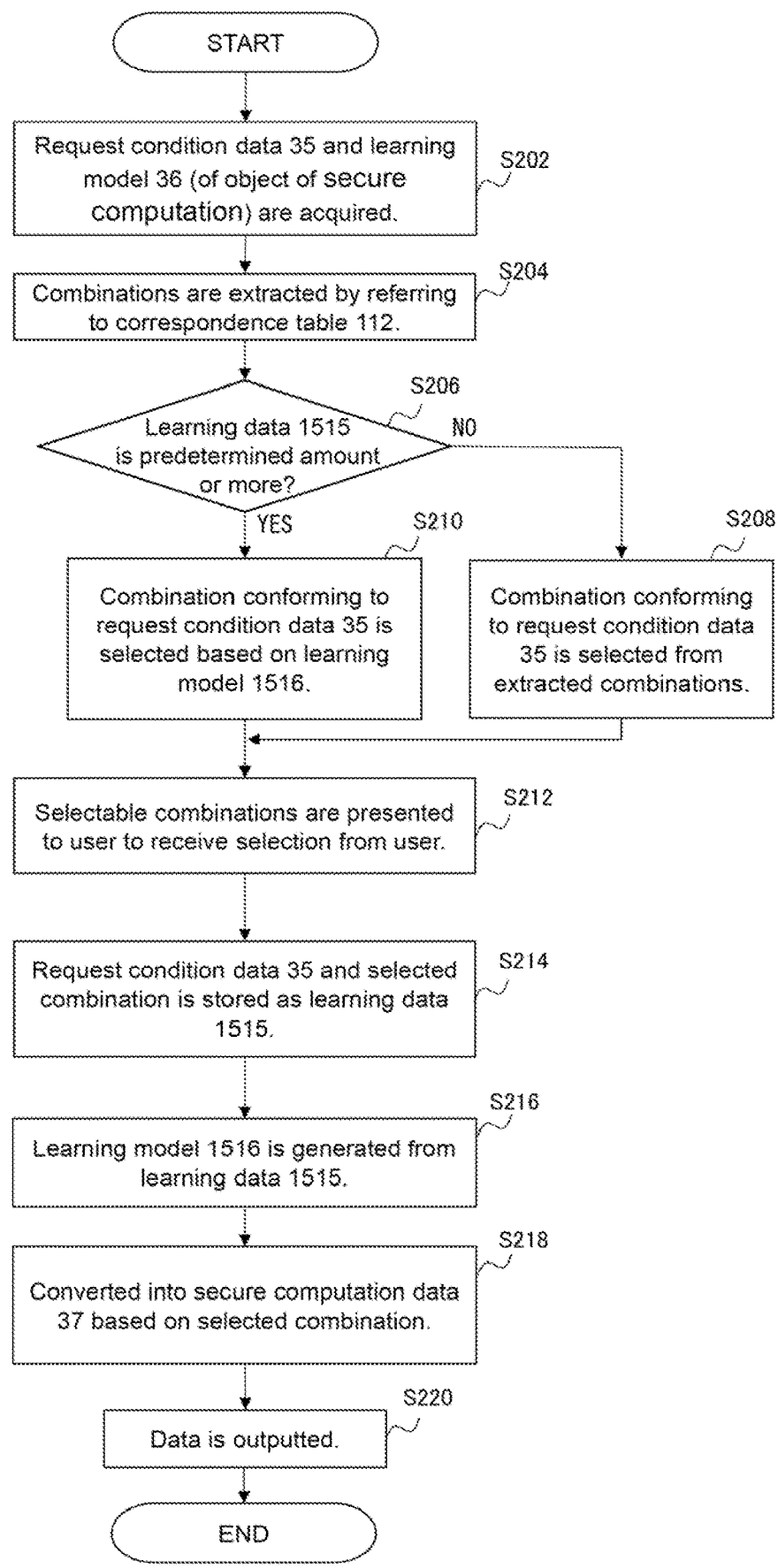
FIG. 16 is a flow chart showing an example of the processes of the conversion module 1526.

FIG. 16 is a flow chart showing an example of the processes of the conversion module 1526. The processes in the conversion module 1526 will be explained with reference to FIG. 16. Note that the order of the processes is merely an example. The order of the processes is not limited. For example, the learning model 1516 is generated (updated) in Step S214 after the learning data 1515 is stored in the following explanation. However, it is also possible to generate (update) the learning model 1516 in Step S210 before using the learning model 1516.

In Step S202, an acquisition unit 100 acquires the request condition data 35 and the learning model 36. The learning model 36 is the object data of the secure computation executed in the secure computation module 28. The acquisition unit 100 transmits the acquired request condition data 35 and learning model 36 to the conversion processing unit 1520. Note that it is also possible to receive the essential conditions from the user as the items of the encryption methods and include them in the request condition data 35.

In Step S204, as for the specification data 41 included in the learning model 36, the conversion unit 1521 of the conversion processing unit 1520 extracts the applicable combinations of the encryption methods by referring to the correspondence table 112 (the algorithm correspondence table 113, i.e., the encryption table 602 and the combination table 604) of the storage unit 1510.

In Step S206, the conversion unit 1521 determines whether or not the data of a pair of the request condition data and the combination of the encryption method stored in the learning data 1515 is a predetermined amount or more. When the learning data 1515 determines that the data is not the predetermined amount or more (No in Step S206), the conversion unit 1521 selects the combination of the encryption methods conforming to the request condition data 35 from the combinations extracted in Step S204 by referring to the request condition data 35 and the score correspondence table 114 in Step S208. Namely, when the learning data is extremely small, accuracy of the learning is low. Thus, as explained in FIG. 11, the combination of the encryption methods is selected by referring to the score correspondence table 114 instead of the learning model 1516. It is also possible to select a plurality of combinations of the encryption methods in the order of the conformity for receiving the selection of the combination of the encryption methods from the user in the later described Step S212.

On the other hand, when the learning data 1515 determines that the data is the predetermined amount or more (Yes in Step S206), the conversion unit 1521 selects the combination conforming to the request condition data 35 based on the learning model 1516 in Step S210. Note that a plurality of combinations is selected by the conversion unit 1521 and presented to the user in the later described Step S212 so that the combination to be applied for the conversion of the secure computation data is selected by the user.

In Step S212, the conversion unit 1521 presents the combinations of the encryption methods selected based on the learning model 1516 to the user via a (not-illustrated) display unit. The user judges whether or not the presented encryption methods conform to the request condition data 35 as needed. This is because there is a possibility that the leaning model 1516 does not conform to the request conditions of the user when the accuracy is low although there is a high possibility that the leaning model 1516 conforms to the request conditions of the user when the learning model 1516 is generated precisely. When presenting the combinations of the encryption methods, it is possible to also display the cost, the speed, the security level and the like of each combination. It is also possible to display the not selected combinations of the encryption methods with the cost, the speed, the security level and the like. Consequently, the user can refer to the cost and the like of each combination. Thus, the user can easily specify the combination of the encryption methods (as described later).

The conversion unit 1521 receives the instruction of specifying the combination of the encryption methods for converting the secure computation data from the user. Note that the process of Step S212 can be omitted depending on the existence/absence of specialized knowledge in the fields of encryption and AI of the user and the degree of the understanding of the user. Since it is difficult for the user who does not have specialized knowledge to judge the optimum combination of the encryption methods, the conversion unit 1521 selects one of the combinations for such user and determines it as the combination of the encryption methods applied to the conversion of the secure computation data. For example, in Step S210, the conversion unit 1521 selects the combination having a higher relative relation without selecting a plurality of combinations of the encryption methods.

It is also possible to receive the instruction for specifying the other combinations of the encryption methods than the presented combinations from the user in Step S212. For example, when the user gives the highest priority to the cost in the request conditions but not-selected combinations (described above) of the encryption methods also include the acceptable cost, it is possible to specify the encryption method while giving priority to the other evaluation conditions.

In Step S214, the conversion unit 1521 stores a pair of the request condition data 35 and the combination received in Step S212 in the storage unit 1510 as the learning data 1515. Namely, the data is stored in the learning data 1515 of the storage unit 1510 each time when the combination of the encryption methods is selected. Thus, the amount of the learning data is increased and the preciseness of the generated learning model is increased. Note that it is possible to give scores (e.g., weights) to the combination of the encryption methods specified by the user in Step S212 so that the relative relation is increased. Consequently, the learning model of the combination of the encryption methods can be generated more precisely.

In Step S216, the learning unit 1500 generates the learning model 1516 from the learning data 1515. As described above, in the processes of the conversion module 1526, the order of generating the learning model 1516 is not limited to after Step S214.

In Step S218, the conversion unit 1521 converts the learning model 36 into the secure computation data 37 based on the selected combination of the encryption methods. Namely, the conversion unit 1521 converts the specification data 41 into the stipulating information 42. In addition, the encryption unit 1522 encrypts the parameter information 43 in accordance with the selected encryption methods. Thus, the encryption parameter information 44 is generated.

In Step S220, the output unit 130 outputs the stipulating information 42 and the encryption parameter information 44 as the secure computation data 37.

It is also possible to feed back the performances (e.g., execution speed and time, space complexity, cost of communications, number of instances, specifications) performed when executing the outputted secure computation data 37 in the secure computation module 28 (shown in FIG. 2) for generating the learning model 1516 by the learning unit 1500. Namely, the learning model is generated based on the request condition data 35, the combination of encryption methods and the relative relation to the above described performances. Consequently, the optimum combination of the encryption methods can be accurately selected.

(Explanation of Effects)

As described above, in the present embodiment, as for the combinations of the encryption methods extracted based on the algorithm correspondence table 113, the conversion unit 1521 selects the optimum combination of the encryption methods based on the learning model 1516 instead of the score correspondence table 114. Consequently, the amount of computation can be reduced since it is not necessary to calculate the scores for each of the extracted combinations.

The above described embodiments can be carried out in other various forms. Various omission, replacement and change can be applied within the range not deviating from the summary of the present invention. The embodiments and the variation of them are included in the range and summary of the present invention and also included in the invention described in the claims and the range equivalent to them.

DESCRIPTION OF THE REFERENCE NUMERALS

10: secure computation system; 12: processing unit; 14: storage unit; 16: memory; 18: storage; 22: data input module; 24: machine learning module; 25: AI library; 26, 1526: conversion module; 28, 1428: secure computation module; 29: secure computation library; 100: acquisition unit; 110: storage unit; 120, 1520: conversion processing unit; 121, 1521: conversion unit; 122, 1522: encryption unit; 130: output unit; 1425, 1500: learning unit; 1427: computation unit; 1515: learning data; 1516: learning model

The invention claimed is:

1. A conversion device for secure computation comprising:
  an acquisition unit configured to acquire an object data of the secure computation;
  a storage unit configured to store a correspondence table specifying an input format required for executing the secure computation;
  a conversion processing unit configured to perform a conversion from the acquired object data into a secure computation data in accordance with the correspondence table; and
  an output unit configured to output the secure computation data, wherein
  the object data at least includes a second data which relates to a machine learning of a first data, and
  the second data includes a specification data of the machine learning of the first data,
  a specification of the machine learning and the input format are associated with each other in the correspondence table, and
  the conversion processing unit is configured to extract the input format corresponding to the specification data of the machine learning from the stored correspondence table and perform the conversion in accordance with the extracted input format.

2. The conversion device for secure computation according to claim 1, wherein
  the acquisition unit is configured to acquire a request condition data for the secure computation, and
  the conversion processing unit is configured to perform the conversion in accordance with the input format selected based on the request condition data in the extracted input format.

3. The conversion device for secure computation according to claim 2, wherein
  the specification data of the machine learning includes an information related to an algorithm used in the machine learning or a source code.

4. The conversion device for secure computation according to claim 3, wherein
  the object data includes a data obtained by performing the machine learning on the first data, and
  the conversion processing unit includes an encryption unit configured to encrypt the data obtained by performing the machine learning in accordance with an encryption method specified in the selected input format as the conversion.

5. The conversion device for secure computation according to claim 3, wherein
  the object data includes the first data,
  the conversion processing unit includes an encryption unit configured to encrypt the first data in accordance with an encryption method specified in the selected input format as the conversion.

6. The conversion device for secure computation according to claim 5, wherein
  the request condition data includes a selective condition related to the secure computation or a plurality of evaluation conditions to which a score is given, and
  the conversion processing unit is configured to perform the conversion in accordance with the input format selected based on the selective condition and/or the score.

7. The conversion device for secure computation according to claim 6, wherein
  the evaluation conditions include a condition related to at least one of a processing speed, a security level and a cost, and
  the evaluation conditions are configured to be input via a graphical user interface.

8. The conversion device for secure computation according to claim 6, wherein
  the storage unit is configured to store the request condition data and the input format of the conversion performed in accordance with the request condition data,
  a learning unit configured to learn a relation between the stored request condition data and the input format of the conversion performed in accordance with the request condition data is further provided, and
  the conversion processing unit is configured to perform the conversion in accordance with the learned relation.

9. The conversion device for secure computation according to claim 1, wherein
  the input format is a data specified by any one of or a combination of an encryption type, an encryption scheme, a unit of a data to be encrypted, a data structure, a processing protocol and an architecture for the secure computation.

10. A secure computation system comprising:
  a processing request unit configured to transmit a processing request of an object data of a secure computation;
  a secure computation conversion unit; and
  a secure computation execution unit, wherein
  the secure computation conversion unit includes:
  an acquisition unit configured to acquire the object data via the processing request unit;
  a storage unit configured to store a correspondence table specifying an input format required for executing the secure computation;
  a conversion processing unit configured to perform a conversion from the acquired object data into a secure computation data in accordance with the correspondence table; and
  an output unit configured to output the secure computation data to the secure computation execution unit, wherein
  the object data at least includes a second data which relates to a machine learning of a first data, and
  the second data includes a specification data of the machine learning of the first data,
  a specification of the machine learning and the input format are associated with each other in the correspondence table, and the conversion processing unit is configured to extract the input format corresponding to the specification data of the machine learning from the stored correspondence table and perform the conversion in accordance with the extracted input format.

11. A conversion method for converting an object data of secure computation into a secure computation data, the conversion method being executed by a computer having a control unit and a storage unit, the conversion method comprising:
a step of acquiring the object data of the secure computation by the control unit;
a step of storing a correspondence table specifying an input format required for executing the secure computation in the storage unit by the control unit;
a step of performing a conversion from the acquired object data into a secure computation data in accordance with the correspondence table by the control unit; and
a step of outputting the secure computation data by the control unit, wherein
the object data at least includes a second data which relates to a machine learning of a first data, and
the second data includes a specification data of the machine learning of the first data,
a specification of the machine learning and the input format are associated with each other in the correspondence table, and
the conversion processing unit is configured to extract the input format corresponding to the specification data of the machine learning from the stored correspondence table and perform the conversion in accordance with the extracted input format.

\* \* \* \* \*